Figure 4:
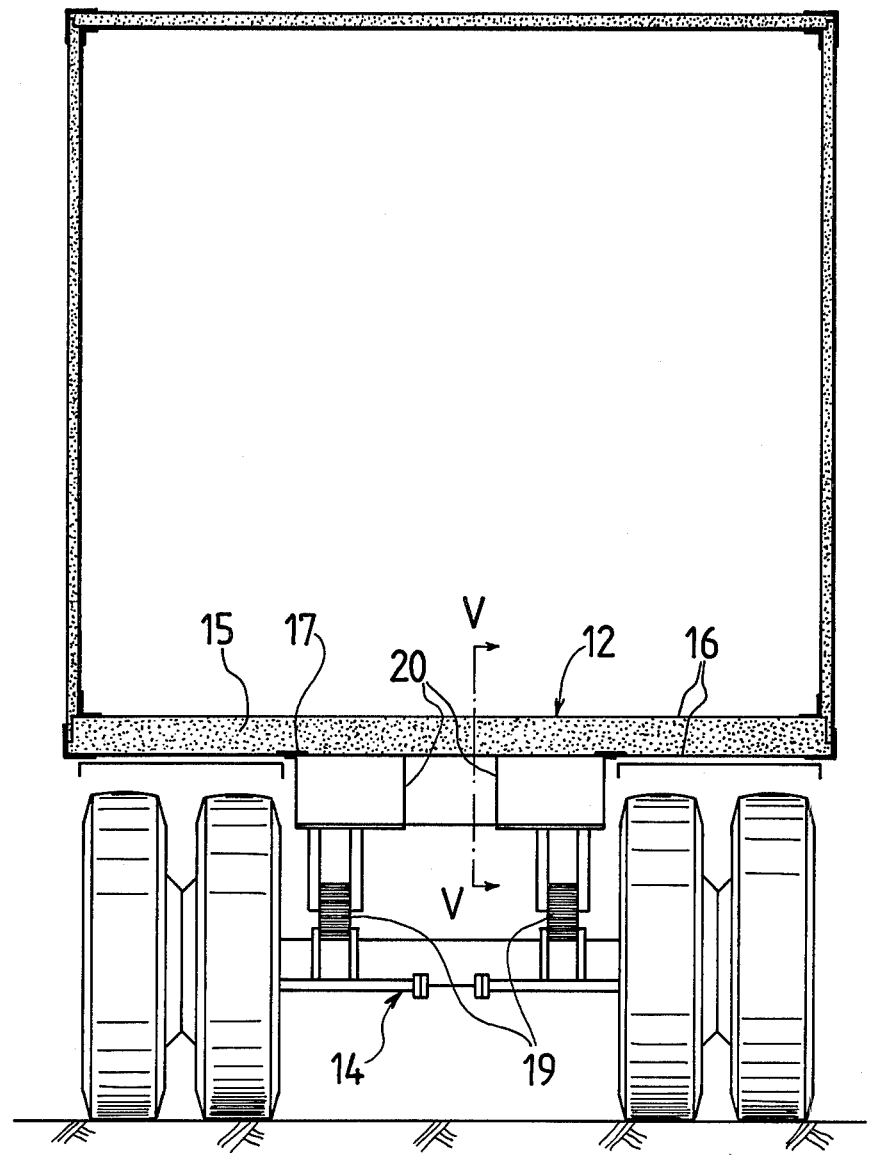

United States Patent [19]

Widman

[11] Patent Number: 4,482,589
[45] Date of Patent: Nov. 13, 1984

[54] METAL COVERED CELLULAR PVC

[75] Inventor: Jan Widman, Halmstad, Sweden

[73] Assignee: Additainer AB, Halmstead, Sweden

[21] Appl. No.: 518,309

[22] PCT Filed: Dec. 1, 1982

[86] PCT No.: PCT/SE82/00409
 § 371 Date: Jul. 14, 1983
 § 102(e) Date: Jul. 14, 1983

[87] PCT Pub. No.: WO83/02097
 PCT Pub. Date: Jun. 23, 1983

[30] Foreign Application Priority Data
 Dec. 10, 1981 [SE] Sweden .................................. 8107409

[51] Int. Cl.³ .......................... B32B 3/02; B32B 1/02; B32B 15/08
[52] U.S. Cl. ..................................... 428/35; 52/309.7; 220/902; 296/31 P; 428/159; 428/167; 428/172; 428/319.1

[58] Field of Search ............... 52/309.9, 309.11, 309.7; 105/396, 409, 423; 220/444, 453, 902; 296/31 P, 182; 428/35, 114, 119, 159, 167, 172, 314.4, 314.8, 317.1, 317.7, 319.1

[56] References Cited

U.S. PATENT DOCUMENTS

| 3,003,810 | 10/1961 | Kloote et al. | 296/31 P |
| 3,924,039 | 12/1975 | Smith, Jr. | 428/119 |
| 4,032,680 | 6/1977 | Allard | 52/309.7 |
| 4,376,494 | 3/1983 | Bjurling | 220/902 |

FOREIGN PATENT DOCUMENTS 1254220  1/1961  France ............................. 428/319.1

Primary Examiner—William J. Van Balen
Attorney, Agent, or Firm—Holman & Stern

[57] ABSTRACT

Self carrying platform of the sandwich type forming a closed goods accommodating space, preferably for refrigerator/freezer trailers, comprising a core (15) and surface layers (16) laminated thereto. The surface layers consist of metal plates and the core of a constructional cellular plastics on PVC-basis. At least one mounting plate (17) for a wheel shaft arrangement/demountable body framing is adhesively attached to the core.

13 Claims, 12 Drawing Figures

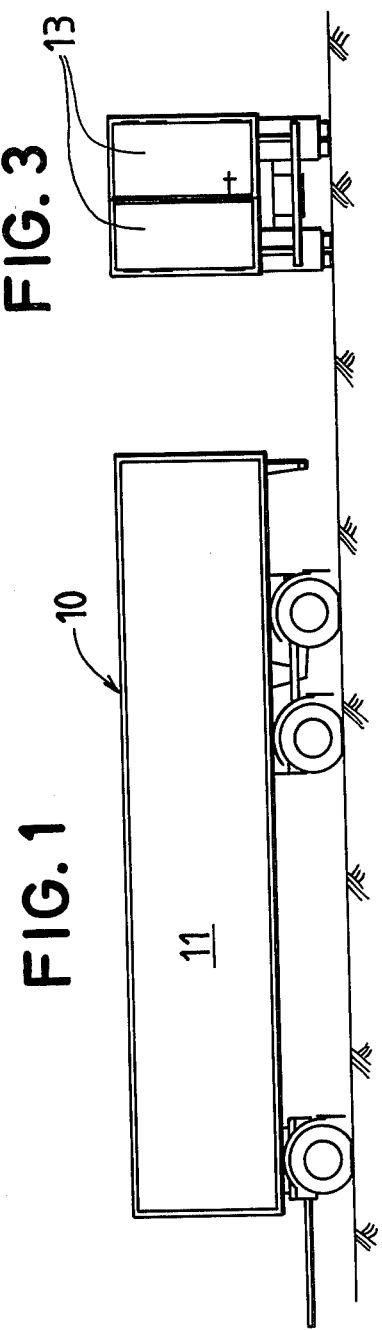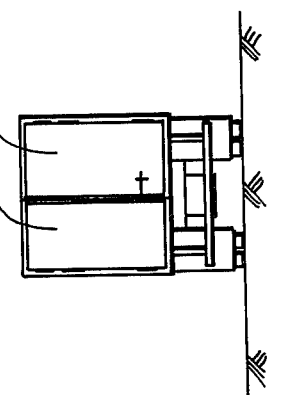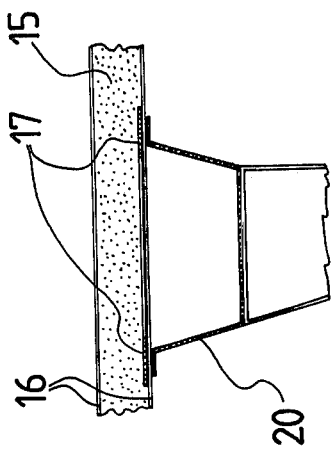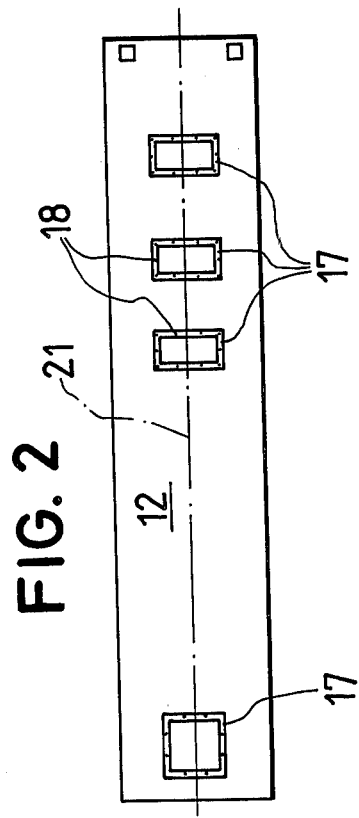

METAL COVERED CELLULAR PVC

CROSS-REFERENCE TO PRIOR CASES

This case stems from PCT/SE82/00409 filed Dec. 1, 1982 claiming priority from Swedish application 81/07409-8 filed Dec. 10, 1981.

TECHNICAL FIELD

The present invention relates to self carrying platforms forming a closed goods receiving space, preferably for refrigerator and/or freezer trailers, where the platform comprises a multi-layer or laminated structure of the "sandwich" type.

THE STATE OF THE ART

There are previously known platforms consisting substantially entirely of plastics material, for example from U.S. Pat. No. 3,003,810. Such platforms, however, do not meet the requirements of strength—in spite of the presence of reinforcing plates of "Plywood"—wear resistance and long term characteristics, such as water vapor impermeability. Said plastic/"Plywood" platforms may also include attachment devices, for instance, of the metal plate type, for the mounting of wheel shafts.

There are also known a number of other type of non-self-supporting "sandwich" structures, some having surface layers of metal. For instance, U.S. Pat. No. 3,481,642 shows an arrangement using supporting beams comprising outer layers of metal profiles and a core of PVC. The Swedish specification No. 307 079 deals with a structure based on a polyurethane core having outer layers of metal plate. The German AS No. 1 238 349 generally relates to "sandwich" platforms having through-going anchoring members. German OS No. 2 712 977 teaches a "corrugation"-technique quite useless in self carrying structures, especially as the corrugations are vertical ones. French Pat. No. 1 414 949 shows a type of platform comprising a large number of reinforcing elements. French Pat. No. 1 469 545 relates to an insulating tank where merely the inner container is reinforced by longitudinal beams. The British Pat. No. 941 905 describes a steel tank which is thermally insulated and supported in a cradle.

TECHNICAL PROBLEM

The problem behind the present invention is to improve the "sandwich" technique within the actual field and eliminate the said drawbacks and offer a self carrying structure being at an optimum from all points of view.

Additionally, the problem is to achieve an improved attachment of the wheel shaft(-s) of the platform and/or a framing of the platform, in the latter case being of the "demountable body" type, by using at an optimum the advantages of the sandwich-structure.

SOLUTION

The invention provides a self carrying platform forming a closed goods accomodating space, where at least the bottom of the goods accomodating space comprises a core of constructional cellular plastics on PVC-basis having a density in the range of 60 to 100 kg/m$^3$, preferably 80 kg/m$^3$, and where on both sides thereof the core is covered by metal plates attached to said sides.

A constructional plastics of the type mentioned has "closed cells" that maintain the "closed" configuration thereof for an unlimited time, at least from a practical point of view.

Preferably, there is arranged a mounting plate for plates) for at least one wheel shaft. The plate is adhesively attached to the core and located close to and symmetrically relative the centre line of the platform.

The mounting plate is insertable with advantage into a recess in the core between the lower surface layer and the core, and holes are formed in the mounting plate for the attachment of the wheel shaft arrangement.

Preferably, the attachment is obtained by bolt joints applied in said holes.

The attachment plate preferably is a four sided frame and is attached to the core as well as the surface layer.

A polyuerthane glue may be used for the adhesive attachment.

In the embodiment where a framing is arranged for the platform, preferably a framing for a so called "demountable body", such framing is attached to at least one mounting plate adhesively bonded to the core.

Such plate preferably comprises several metal strips extending generally parallel to and symmetrically relative the centre line of the platform/body.

The strips may be placed in recesses in the core between the lower surface layer and the core.

Bolt joints may be used for attaching the framing in holes in the strips.

ADVANTAGES

Due to the fact that the core consists of a constructional cellular plastics having closed cells, in the proper meaning thereof, and because the surface layers consist of metal plates there is obtained an absolute diffusion tightness.

As the actual sandwich structure does not require any hard, stiffening layer, of the plywood type or similar, there is obtained deformation resistance of the platform when loading and at impact by using the resilient elasticity of the core in combination with the soft flexibility/pliability.

The self carrying platform and the mounting plate(-s) adhesively attached to the core eliminate the need for a supporting frame and wheel shaft(-s) carrying devices mounted thereto.

The lack of a frame and other supporting structure, for instance beams, efficiently eliminate conduction of cold and makes the structure well suited for refrigerator/freezer trailers.

The preferred placement of the mounting plate(-s) in close proximity to and symmetrically relative the centre line of the platform implies a favourable transfer and distribution of forces from/to the wheel shaft attachment to/from the sandwich structure, such that the characteristics of the sandwich construction are used at an optimum at the same time as deformation tendencies and other strains originating from road surface roughness are attenuated due to the fact that the platform senses such strains essentially along a centre line which relatively seen is stable.

The placement of the mounting plate(-s) along the centre line may be selected freely quite regardless of supporting structures. In the basic version the platform may for instance be provided with mounting plates in positions corresponding to the positions of several trailer types, multi shaft ones, semi-trailers, or in positions for framings for platforms of the demountable body type. In such a case it is the free choice of the user to decide whether the trailer should be for instance a three shaft one or a semi-trailer or to decide on the specific design of the framing.

By arranging the attachment to the mounting plate(s) as a bolt joint it is an easy measure for the user, even at a later stage, to modify the trailer type and/or framing within the scope of possibilities offered by the existing mounting plates.

The high density of the preferred constructional cellular plastics compared to for instance polyurethane, polystyrene, still implies a most considerable weight reduction compared to non-sandwich structures, but also means a lone term not-water absorbing sandwich core. In comparison, it may be mentioned that in certain polyurethane structures there has been measured very large water quantities corresponding to several tens of percent of the total weight.

DESCRIPTION OF THE ACCOMPANYING DRAWINGS

Figure 8:
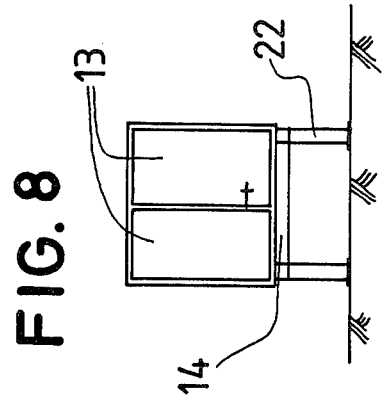
Figure 9:
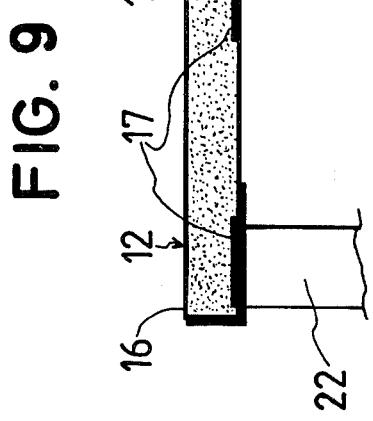
Figure 6:
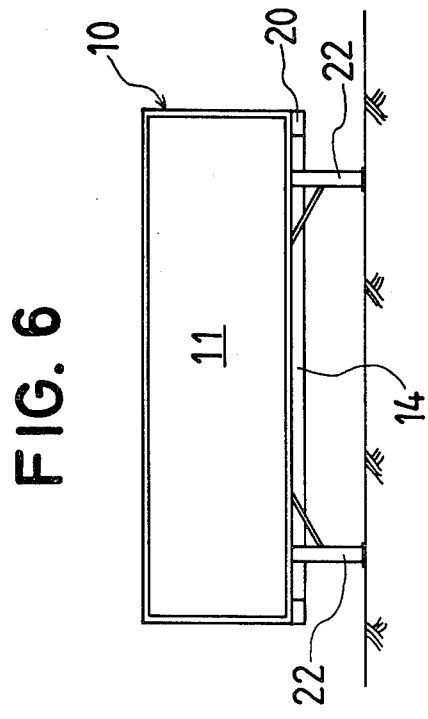
Figure 7:
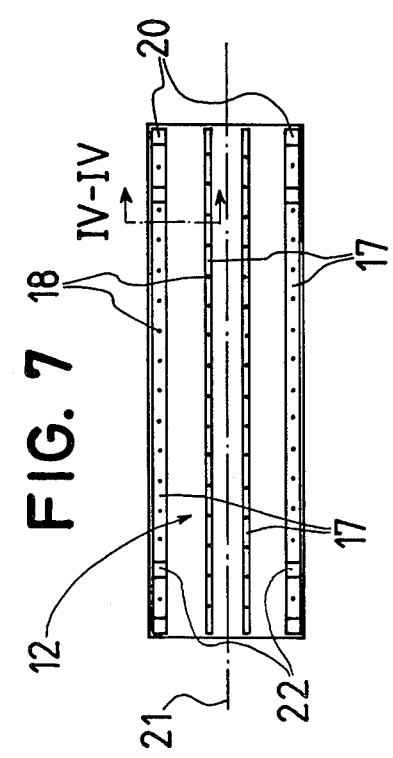
Figure 10:
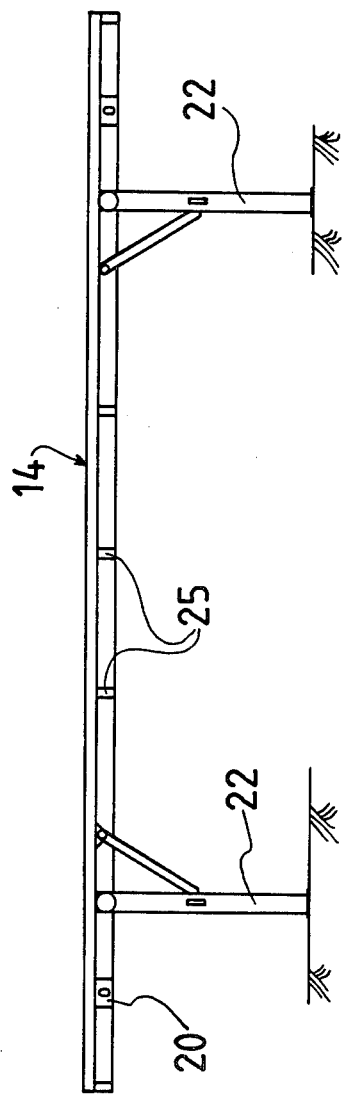
Figure 12:
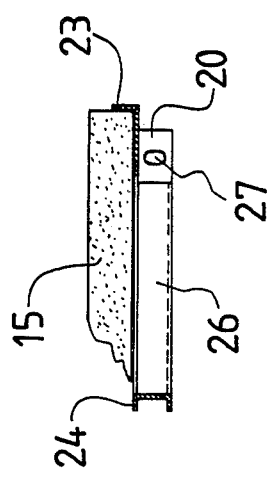
Figure 11:
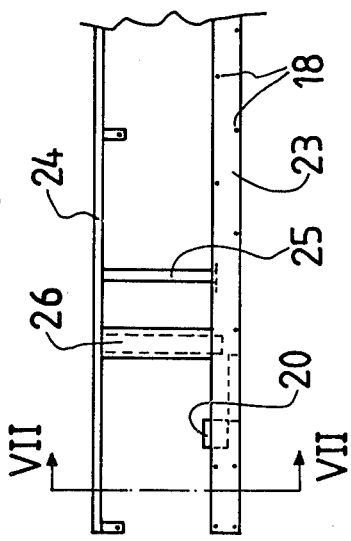

FIG. 1 is a side elevation view of a three shaft trailer having a platform according to the present invention, FIG. 2 is a view from below of the trailer, FIG. 3 is a view from behind of the trailer, FIG. 4 is a vertical partial section through the vehicle, FIG. 5 is a partial section along line V—V in FIG. 4, FIG. 6 is a side elevation view of a platform having a framing of the "demountable body" type, FIG. 7 is a schematic view from below of the platform and framing, FIG. 8 is a view from behind of the trailer, FIG. 9 is a partial section along line IV—IV in FIG. 2, FIG. 10 is a side elevation view of the framing, FIG. 11 is a view from above of the framing, and FIG. 12 is a section along line VII—VII in FIG. 6.

The trailer 10 in FIG. 1 comprises an upper structure 11 of a sandwich type known per se, a bottom or platform 12 according to an embodiment of the invention, doors 13 for closing the upper structure and a wheel shaft arrangement 14, 15.

The platform 12 consists of a core of the constructional cellular plastics DIVINYCELL ® on polyvinylchoride basis having a thickness of approximately 120 mm. On each side of this core 15 there is attached, for instance by polyurethane glue, a metal plate 16 of aluminium having a thickness of approximately 2 mm. The platform forms a sandwich structure or laminate where the plates 16 are rigidly attached to the core 15.

In the core 15 there are formed grooves and in such grooves frame shaped mounting plates 17 of band steel are fixed to the core 15, preferably by using the same type of glue as is used in the rest of the sandwich structure. In the embodiment that has been shown, the band steel has a dimension of 100×10 mm. The lower aluminium plate 16 covers (adhesively) the mounting plates. Holes 18, preferably threaded ones, for accomodating bolt joints are formed in the mounting plates 17 and the lower aluminium plate.

Wheel shafts 14 and spring packages belonging thereto are attached by means of "boxes" 20 to a respective one of the mounting plates and are fixed by bolts in the holes of the mounting plates.

The mounting plates 18 and thereby the wheel shafts 14 are placed centrally and symmetrically along the longitudinal axis of the trailer 10.

The transfer, distribution of forces from/to the wheel shaft attachments to/from the platform 12 occurs by utilizing the characteristics of the material of the laminated floor structure without disturbing contribution from side beams, a frame, reinforcing profiles, etc.

In the embodiment that has been disclosed in FIGS. 1-5 the mounting plates 17 have positions corresponding to the need of a three shaft trailer. Such a trailer has been shown also on the drawings. However, it should be emphasized that the mounting plates may be arranged in any desired manner allowing user determined utilization of the desired number of mounting plates.

In the embodiment according to FIGS. 6 to 12, there is no wheel shaft arrangement but a platform framing 14 for a "demountable body", the framing having boxes/plates 20 for the attachment of the platform in a manner known per se onto a truck. Support legs 22 are fixed by bolt joints in the holes 18 of the attachment strips and the framing.

The attachment strips and thus the framing 14 are located centrally and symmetrically along the longitudinal axis of the trailer.

In the embodiment shown in FIGS. 6 to 8, the attachment strips 17 are located as required by the framing in FIGS. 10 to 12.

The framing comprises frame elements placeable along the longitudinal sides of the body/housing 11. Each frame element consists of two longitudinal beams 23,24 of a length generally equal to the length of the housing 11. The beams are interconnected by several cross beams 25 and a leg support cradle at each end position. The support legs 23 of the framing are hinged in the cradle in a manner known per se.

The framing 14 is intended to be fixed to the housing 11 by bolts in the holes 18.

At both ends of each longitudinal beam 23 there are corner boxes or -plates 27 having openings 27 for accomodating lock pins of a truck for the transportation of the platform, which is of the "demountable body" type.

I claim:

1. A self carrying platform forming a closed goods accommodating space, preferably for refrigerator/freezer trailers, where at least the bottom of the goods accommodating space comprises a core of constructional cellular plastic and surface layers laminated to the core, the improvement being in that the core consists of a constructional cellular plastic of PVC having a density within the range of 60 to 100 kg/m$^3$, preferably 80 kg/m$^3$, relatively thin metal plates are attached to and cover both sides of the core, and a mounting plate for a wheel shaft arrangement is adhesively attached to said core.

2. The platform according to claim 1 wherein the mounting plate is arranged in close proximity to and symmetrically relative the centre line of the platform.

3. The platform according to claim 2, wherein the mounting plate is attached in a recess in the core between the lower surface layer and the core.

4. The platform according to claim 3, wherein holes for the wheel shaft arrangement are formed in the mounting plate.

5. The platform according to claim 4, wherein the wheel shaft arrangement is attachable by bolt joints in said holes.

6. The platform according to claim 1, wherein the mounting plate is a four sided frame.

7. The platform according to claim 6, wherein the mounting plate is attached to the core as well as the lower surface layer.

8. A self carrying platform forming a closed goods accommodating space, preferably for refrigerator/freezer trailers, where at least the bottom of the goods accommodating space comprises a core of constructional cellular plastic and surface layers laminated to the core, the improvement being in that the core consists of a constructional cellular plastic of PVC having a density within the range of 60 to 100 kg/m$^3$, preferably 80 kg/m$^3$, relatively thin metal plates are attached to and cover both sides of the core, and at least one mounting plate for a platform framing is attached adhesively to the core.

9. The platform according to claim 8, wherein the mounting plate comprises several metal strips extending generally parallel to and symmetrically relative the centre line of the platform.

10. The platform according to claim 9, wherein the strips are placed in recesses in the core between the lower surface layer and the core.

11. The platform according to claim 10, wherein holes for attachment of the platform framing are formed in the strip.

12. The platform according to claim 11, wherein the platform framing is attached by bolt joints in said holes.

13. The platform according to claim 8, wherein the platform framing is a framing for a so called demountable body.

* * * * *